United States Patent
Lin

(10) Patent No.: US 6,973,869 B1
(45) Date of Patent: Dec. 13, 2005

(54) EXTRACTION DEVICE

(76) Inventor: Huan-Liang Lin, No. 1, Minchuan St., Penhsiang Village, Wufeng Hsiang, Taichung Hsien (TW)

( * ) Notice: Subject to any disclaimer, the term of this patent is extended or adjusted under 35 U.S.C. 154(b) by 33 days.

(21) Appl. No.: 10/942,468

(22) Filed: Sep. 16, 2004

(51) Int. Cl.[7] ............................. A23L 1/00; A47J 31/00
(52) U.S. Cl. ........................... 99/275; 99/275; 99/495
(58) Field of Search ................... 99/495, 496, 275, 99/276, 277, 277.1, 277.2, 279, 289 R, 290, 99/291–300, 304–316, 323.3, 323.1; 426/431, 426/433, 432, 435, 655, 436, 285

(56) References Cited

U.S. PATENT DOCUMENTS

| | | | | |
|---|---|---|---|---|
| 3,535,116 A | * | 10/1970 | Harsanyi ........................ | 426/29 |
| 3,726,209 A | * | 4/1973 | Stoltze et al. .............. | 99/495 X |
| 3,857,332 A | * | 12/1974 | Houghton-Larsen et al. | . 99/536 |
| 3,871,272 A | * | 3/1975 | Melandri ................... | 99/495 X |
| 3,966,975 A | * | 6/1976 | Hansen et al. .............. | 426/285 |
| 4,220,673 A | * | 9/1980 | Strobel ........................ | 426/655 |
| 4,919,041 A | * | 4/1990 | Miller ....................... | 99/495 X |
| 5,558,006 A | * | 9/1996 | Kuboyama .................... | 99/275 |

* cited by examiner

*Primary Examiner*—Timothy F. Simone
(74) *Attorney, Agent, or Firm*—Alan D. Kamrath; Nikolai & Mersereau, P.A.

(57) ABSTRACT

An extraction device for extracting a beverage with cold or iced water has a tube, a fluid pressurization device and a connector. The connector has a holder with a bottom, a seat, an atomizer and a discharge pipe. The seat is mounted in the bottom of the holder and the atomizer is mounted through the holder and the seat. The extraction chamber is screwed into the seat and has a discharge orifice through which an extracted beverage passes. The fluid pressurization device is connected to the connector. The tube has an outlet end connected to the fluid pressurization device and inlet end connected to a water source. When the extraction device is used, a beverage can be extracted with cold water or iced water quickly, and the flavor of the extracted beverage can be maintained.

4 Claims, 3 Drawing Sheets

EXTRACTION DEVICE

BACKGROUND OF THE INVENTION

1. Field of Invention

The present invention relates to an extraction device for producing a cold beverage that is capable of rapid and low temperature extraction.

2. Description of the Related Art

Coffee makers and similar beverage extraction devices are available. However, most beverage extraction devices provide hot beverages. To make iced beverages, such as iced coffee, the practice has been to extract a small amount of strong coffee, then add ice to the small amount of strong coffee. However, preparing cold beverages with this technique is troublesome and time-consuming, and sometimes causes the aroma to vanish.

Now, an extraction device that can extract cold beverages is on the market but is still time consuming, for example, often taking 8 hours to obtain 1500 c.c. of cold brewed coffee.

The extraction device in accordance with the present invention obviates or mitigates the aforementioned problems.

SUMMARY OF THE INVENTION

The primary objective of the present invention is to provide an extraction device to extract a beverage with cold or iced water.

The extraction device has a tube, a fluid pressurization device and a connector. The connector has a holder with a bottom, a seat, an atomizer and a discharge pipe. The seat is mounted in the bottom of the holder, and the atomizer is mounted through the holder and the seat. The extraction chamber is screwed into the seat and has a discharge orifice through which an extracted beverage passes. The fluid pressurization device is connected to the connector. The tube has an inlet end and an outlet end. The outlet end of the tube is connected to the fluid pressurization device, and the inlet end of the tube is connected to a water source.

When the extraction device is used, a beverage can be extracted with cold water or iced water quickly, and the flavor of the extracted beverage can be maintained.

Other objectives, advantages and novel features of the invention will become more apparent from the following detailed description when taken in conjunction with the accompanying drawings.

DETAILED DESCRIPTION OF THE INVENTION

Figure 1:
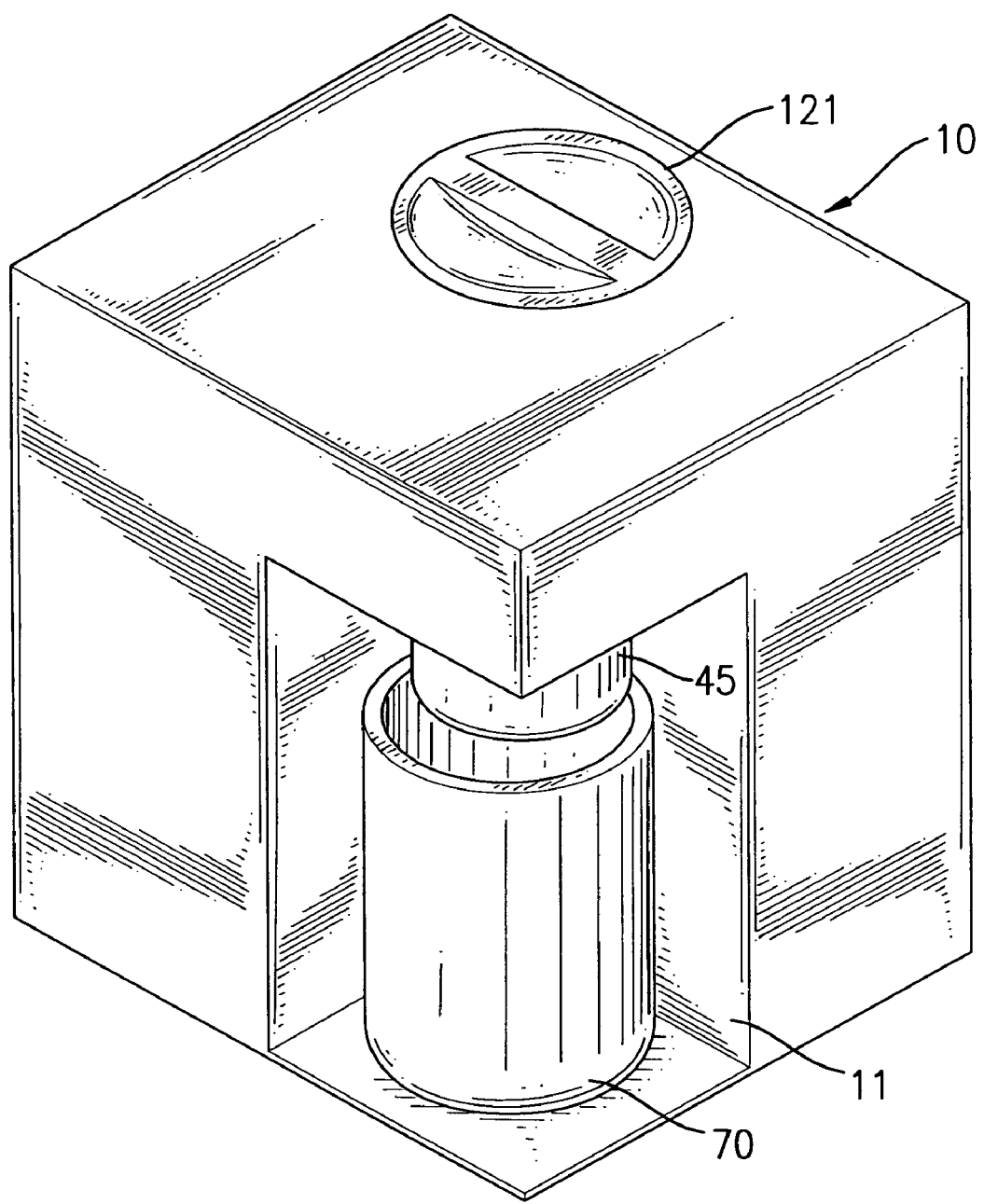
FIG. 1 is a perspective view of an extraction device in accordance with the present invention.
Figure 2:
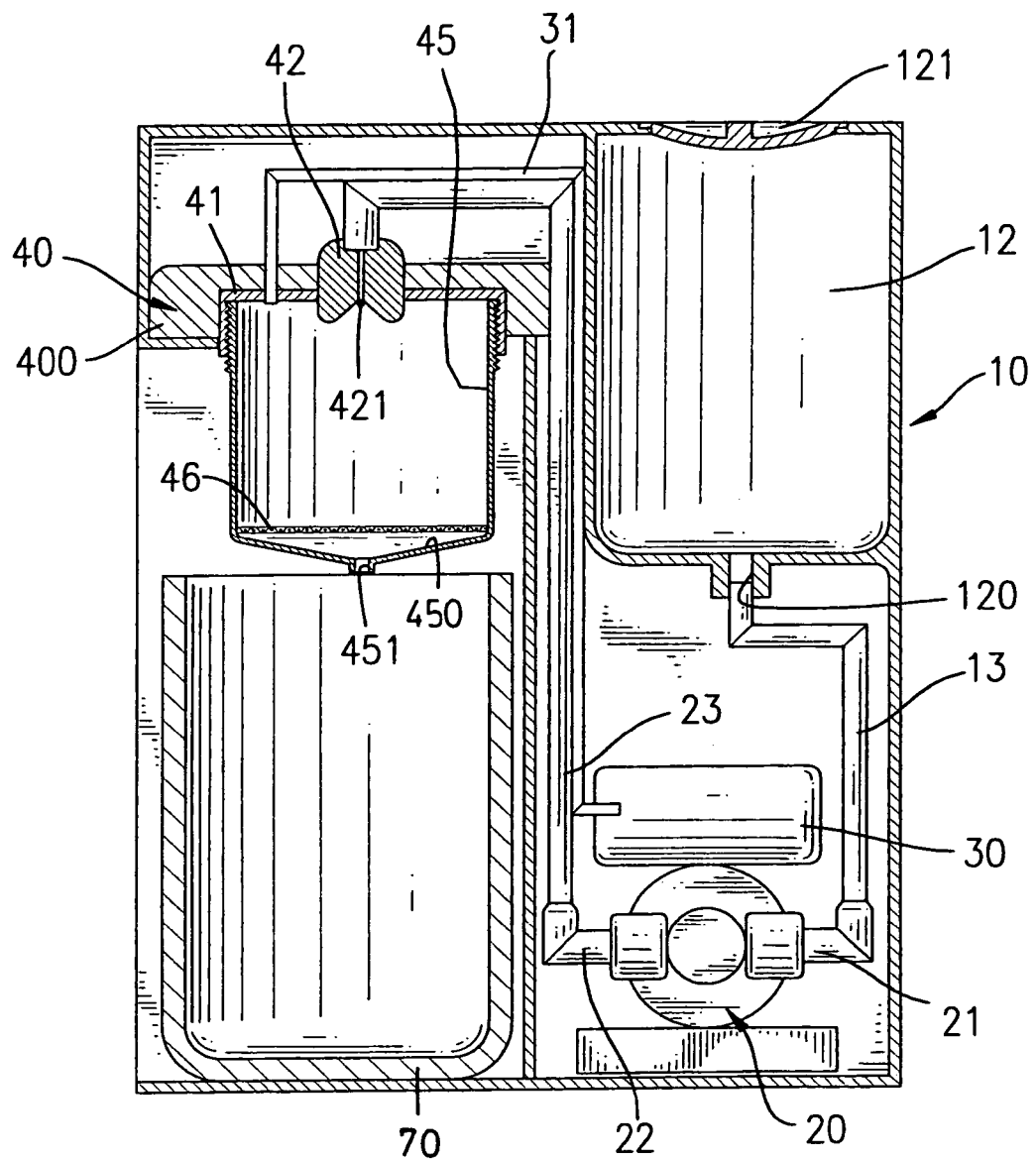
FIG. 2 is a side view in partial section of the extraction device in FIG. 1.

With reference to FIGS. 1 and 2, the extraction device in accordance with the present invention has an optional body (10), a fluid pressurization device, a connector (40) and an optional beaker (70).

The body (10) has a top, a side surface, an internal cavity, an inside surface, a dispensing cavity (11), a cap (121), a water container (12) and a tube (13). The dispensing cavity (11) is defined in the side surface of the body (10) and is used for containing the beaker (70). The water container (12) is mounted in the internal cavity of the body (10) and has a top, a bottom, an opening and a discharge orifice (120). The top of the water container (12) is flush with the top and the inside surface of the body (10), and the opening is defined in the top of the body (10). The cap (121) is mounted on and closes the opening. The discharge orifice (120) is defined in the bottom of the water container (12). The tube (13) has an inlet end and a discharge end. The inlet end of the tube (13) is connected to the discharge orifice (120) of the water container (12).

The fluid pressurization device is connected to a water source and pressurizes a fluid, such as air and water, to generate pressurized air and water. The fluid pressurization device may have a pump (20), a water discharge tube (23), an air compressor (30) and an air pipe (31). The pump (20) has an input (21) and an output (22). The input (21) of the pump (20) is connected to the discharge end of the tube (13). The water discharge tube (23) also has an inlet end and an outlet end. The inlet end of the water discharge tube (23) is connected to the output (22) of the pump (20). The air compressor (30) is mounted with the pump (20) and has an air output. The air pipe (31) has an inlet end and an outlet end. The inlet end of the air pipe (31) is connected to the air output of the air compressor (30).

The connector (40) is mounted inside the body (10) and faces the dispensing cavity (11). The connector (40) has a holder (400), a seat (41), an atomizer (42) and an extraction chamber (45). The holder (400) has a bottom. The seat (41) is an inverted U-shape, is mounted inside the bottom of the holder (400) and has an inner surface. The atomizer (42) is mounted through the holder (400) and the seat (41) and has an atomizing orifice (421). The outlet end of the water discharge tube (23) is connected to the atomizer (42) at the atomizing orifice (421). The outlet end of the air pipe (31) is mounted through the holder (400) and the seat (41) of the connector (40) and communicates with the extraction chamber (45). The extraction chamber (45) is screwed into the inner surface of the seat (41) and has a funnel bottom (450), an optional filter layer (46) and a discharge orifice (451). The funnel bottom (450) has a lowest point. The filter layer (46) is mounted inside the extraction chamber (45) near the funnel bottom (450), and the discharge orifice (451) is defined at the lowest point in the funnel bottom (450).

Figure 3:
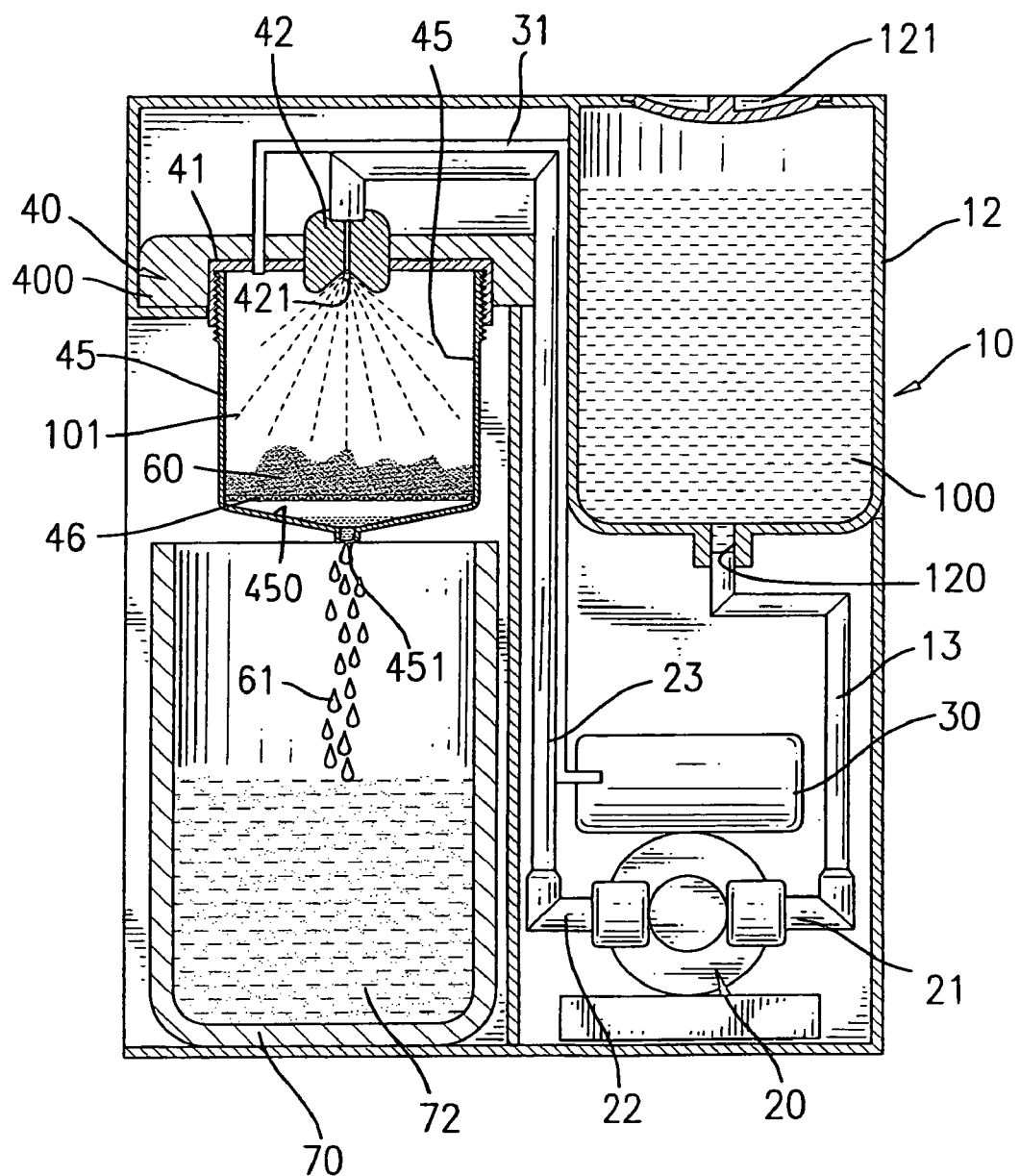
FIG. 3 is an operational side view in partial section of the extraction device in FIG. 1.

With reference to FIG. 3, when the extraction device in accordance with the present invention is used, cold or iced water (100) is poured into the water container (12) in the body (10). A switch is turned on, and the water (100) in the water container (12) is pumped to the input (21) of the pump (20). The water (100) then passes through the pump (20) and the output (22) with a pressure, and the water (100) passes through the water discharge tube (23) and reaches the atomizer (42). The pressurized water (100) is atomized into a mist (101) at the atomizer (42). A ground, pulverized or powdered beverage source (60) is held inside the extraction chamber (45) on the filter layer (46). When the mist (101) rinses the beverage source (60), the air compressor (30) also provides pressurized air through the air pipe (31) to make the beverage source (60) be rinsed by the mist (101) quickly and uniformly. Then, the mist (101) will pass through the beverage source (60) and the filter layer (46) and discharge from the discharge orifice (451) in the extraction chamber (45), and an extracted beverage (61) is obtained. The extracted beverage (61) is collected as extracted beverage fluid (72) in the beaker (70).

Because the air compressor (30) is used for pressurizing the air and the water (100) is pressurized by the pump (20), the beverage source (60) will be extracted by the mist (101) under the pressure. Also, the pressure from the air compressor (30) and the pump (20) causes the extracted beverage (61) to be obtained quickly, and the flavor of the extracted beverage (61) is still maintained.

In a certain embodiment, the present invention comprises a tube (13), a fluid pressurization device and a connector (40). The connector (40) has a holder (400), a seat (41), an atomizer (42) and an extraction chamber (45) and each element is arranged as previously described. The fluid pressurization device connected to the connector (40), and may have a pump (20), a water discharge tube (23), an air compressor (30) and an air pipe (31). The air pipe (31) has an inlet end and an outlet end, and the outlet end of the air pipe (31) and the atomizer (42) are mounted through the holder (400) and the seat (41). The water discharge tube (23) has an inlet end and an outlet end, and the outlet end of the water discharge tube (23) is connected to the atomizer (42). The pump (20) has an input (21) and an output (22). The outlet end of the water discharge tube (23) is connected to the input (21) of the pump (20). The air compressor (30) is mounted with the pump (20) and has an air output. The air output of the air compressor (30) is connected to the inlet end of the air pipe (31). The tube (13) has an inlet end and a discharge end. The discharge end of the tube (30) is connected to the input (21) of the pump (20). However, the inlet end of the tube (13) is directly connected to a water source. Because the tube (13) is directly connected to a water source, the volume of extraction device will be reduced and will not occupy much space.

The invention may be varied in many ways by a person skilled in the art. Such variations are not to be regarded as a departure from the spirit and scope of the invention, and all such modifications are intended to be included within the scope of the following claims.

What is claimed is:

1. An extraction device, comprising
   a connector having
      a holder having a bottom,
      a seat mounted inside the bottom of the holder and having an inner surface,
      an atomizer mounted through the holder and the seat and having an atomizing orifice, and
      an extraction chamber mounted in the seat, communicating with the atomizing orifice and having
         a funnel bottom, and
         a discharge orifice defined in the funnel bottom,
   a fluid pressurization device connected to the connector for generating pressurizing air and mist, and
   a tube having
      an inlet end adapted for connecting to a water source, and
      a discharge end connected to the fluid pressurization device.

2. The extraction device as claimed in claim 1, wherein the extraction device further comprises a body having
   a top,
   a side surface,
   an internal cavity,
   an inside surface,
   a dispensing cavity defined in the side surface of the body,
   a water container mounted in the internal cavity of the body and having
      a top flush with the top and the partial inside surface of the body,
      a bottom,
      an opening defined in the top of the body, and
      a discharge orifice defined in the bottom of the water container, and
   a cap mounted on and closing the opening in the water container, wherein the tube is connected to the discharge orifice,
      the inlet end of the tube is connected to the discharge orifice on the water container, and
      the outlet end of the tube is connected to the fluid pressurization device.

3. The extraction device as claimed in claim 1, wherein the fluid pressurization device further has
   a pump having
      an input connected to the outlet of the tube, and
      an output,
   a water discharge tube having
      an outlet end connected to the holder of the connector; and
      an inlet end connected to the output of the pump,
   an air compressor mounted with the pump and having
      an air output, and
   an air pipe having
      an inlet end connected to the air output of the air compressor, and
      an outlet end mounted through the holder of the connector.

4. The extraction device as claimed in claim 1, wherein the seat of the connector is formed as an inverted U-shape, and the extraction chamber is screwed into the seat of the connector.

* * * * *